United States Patent [19]

Huang

[11] Patent Number: 5,339,683

[45] Date of Patent: Aug. 23, 1994

[54] GAUGE WITH ALARM DEVICE

[76] Inventor: Tien-Tsai Huang, No. 4, Lane 30, Wu-Chang St., Pan-Chiao City, Taiwan

[21] Appl. No.: 49,329

[22] Filed: Apr. 21, 1993

[51] Int. Cl.⁵ .............................................. B60C 23/02
[52] U.S. Cl. ..................................... 73/146.8; 340/445
[58] Field of Search ........................... 73/146.8, 146.5; 340/442, 445; 116/34 R, 34 A; 200/81 H, 83 Q, 61.25, 61.26

[56] References Cited

U.S. PATENT DOCUMENTS

| | | | |
|---|---|---|---|
| 2,249,426 | 7/1941 | Jones et al. | 340/442 |
| 3,296,590 | 1/1967 | Datton | 200/61.25 |
| 4,726,223 | 2/1988 | Huang | 73/146.8 |

*Primary Examiner*—Richard E. Chilcot, Jr.
*Assistant Examiner*—William L. Oen
*Attorney, Agent, or Firm*—Oblon, Spivak, McClelland, Maier & Neustadt

[57] ABSTRACT

A pressure gauge includes an alarm generating device which is actuated by a modified pressure indicating stick upon detection of an insufficient or overinflated pressure condition within a tire. The pressure checking operation is possible even if there is inadequate surrounding light and the gauge can be checked without the need for reading the pressure indicating stick or an associated scale dial.

4 Claims, 7 Drawing Sheets

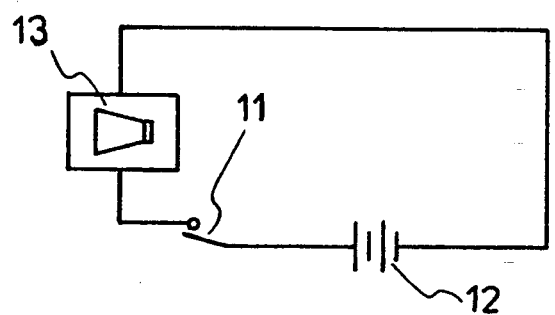
F I G. 1A
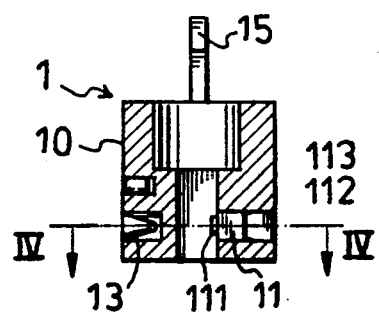
F I G. 1B
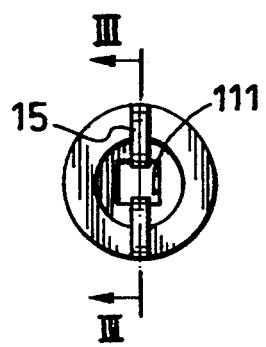
F I G. 2

GAUGE WITH ALARM DEVICE

BACKGROUND OF THE INVENTION

1. Field of the Invention

The invention relates to a pressure indicator, more particularly to a tire pressure gauge which is provided with an alarm generating device so as to warn the driver upon detection of insufficient or excessive pressure in a tire.

2. Description of the Related Art

A pen-type conventional tire pressure indicator comprises a hollow elongated main casing having a first end, which is to be connected to the inflating valve of a tire so as to open the inflating valve, and a second end which has a central hole formed therethrough. A piston member is movably provided inside the main casing and is in tight contact with an interior wall surface of the main casing. A pressure indicating stick has a first end that is disposed inside the main casing adjacent to the piston member and a second end that extends out of the main casing via the central hole in the second end of the main casing. A biasing spring is provided between the piston member and the second end of the main casing.

When the main casing is attached to the inflating valve of a tire, air pressure from the tire pushes the piston member to move toward the second end of the main casing. The compression spring is compressed, and the pressure indicating stick extends through the second end of the elongated main casing by a length corresponding to the air pressure inside the tire. Since a scale is disposed along a longitudinal length of the pressure indicating stick, the user can easily read the amount of pressure.

A gauge-type conventional tire pressure indicator is generally similar to the pen-type tire pressure indicator except that the former has a circular casing which is disposed around the second end of the elongated main casing. The circular casing has a front side provided with a dial, a rear side opposite to the front side and a toothed wheel rotatably mounted therein. A scale indicator is fixed to the toothed wheel inside the circular casing. The pressure indicating stick employed in this type includes a rack which meshes with the toothed wheel. When the first end of the elongated main casing of the tire pressure indicator is attached to an inflated tire, the pressure indicating stick moves linearly in the elongated main casing so as to rotate the toothed wheel, thus moving the scale indicator in accordance with the incoming pressure.

The tire pressure is usually inspected whenever the driver feels that the tire pressure is insufficient or when a tire has been inflated and it is desired to determine if an excessive or insufficient tire pressure condition exists. The tire pressure is read at the pressure indicating stick or on the scale dial. In the event that the reading operation is carried out under poor visibility, such as where there is inadequate lighting, one would have the difficulty in determining the tire pressure.

SUMMARY OF THE INVENTION

The main objective of the present invention is to provide a pressure gauge which includes an alarm generating device that generates an alarm signal upon detection of insufficient or excessive pressure in a tire.

According to the present invention, a modified pen-type or gauge-type tire pressure indicator is provided with an alarm generating device which includes a press button switch that is actuated by a pressure indicating stick slidably provided in the elongated main casing of the pressure indicator. The press button switch is fixed adjacent to one end of the elongated main casing and is compressed by a predetermined portion of the pressure indicating stick which extends outward of the elongated main casing via said one end of the same. Thus, the alarm generating device is deactivated. The pressure indicating stick has a longitudinal groove which is parallel to the axis thereof and is disposed inside the elongated main casing. Upon linear movement of the pressure indicating stick in the elongated main casing so as to expose the longitudinal groove that is aligned with the press button switch, the press button switch is freed from depression such that the alarm generating device will be activated. Thus, the user of the pressure indicator of the present invention can determine whether the tire is properly inflated without reading the pressure on the indicating stick or on the scale dial. Therefore, tire-checking operation is possible even though there is poor lighting around the tire.

BRIEF DESCRIPTION OF THE DRAWINGS

Other features and advantages of the present invention will become more apparent in the following detailed description of the preferred embodiments with reference to the accompanying drawings, in which:

FIG. 1 (A) shows a block diagram of an alarm generating device employed in the first preferred embodiment of the present invention;

FIG. 1(B) shows a fragmentary cross sectional view of a first preferred embodiment of the pressure indicator, the main casing of the pressure indicator being removed for better illustration;

FIG. 2 shows a top view of the first preferred embodiment of the present invention;

DESCRIPTION OF THE PREFERRED EMBODIMENTS

Figure 3:
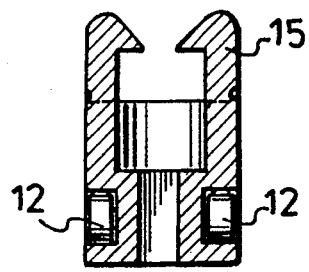
FIG. 3 shows a cross sectional view taken along line III—III in FIG. 2.
Figure 4:
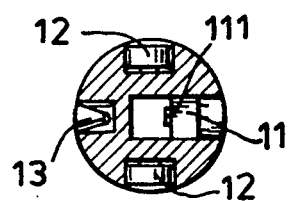
FIG. 4 shows a cross sectional view taken along line IV—IV in FIG. 1 (B)

According to the present invention, the conventional tire pressure indicators described in the prior art is modified by providing the tire pressure indicators with an alarm generating device. The detailed description of the conventional parts of the pressure indicator will be omitted throughout the specification and only the modified parts will be explained herein. The first preferred embodiment of this invention includes an alarm generating device which is mounted on a pen-type tire pressure indicator. FIG. 1 (A) shows a circuit diagram of the alarm generating device employed in the first preferred embodiment. The alarm generating device includes a power source, such as a battery means (12), an alarm signal generator (13), such as a buzzer or a light emitting diode, a press button switch (11) with a press button (111) for actuating the alarm signal generator (13).

Referring to FIGS. 1(B), 2, 3 and 7, the pen-type pressure indicator includes a cylinder-shaped elongated casing (3) with two diametrically opposed radial holes (32) adjacent to a first end (37) thereof and an end portion (36) which is for connecting to an inflating valve of a tire. A tubular sleeve member (1), generally made of plastic, is sleeved partially around the second end (37) of the elongated casing (3) and has two inwardly extending engaging hooks (15) which engage the radial holes (32) in the elongated casing (3). The tubular sleeve member (1) has a wall (10) that confines a through bore (113). The press button switch (11) is fixed in a radial hole (112) of the internal wall (10) of the tubular sleeve member (1). The alarm signal generator (13) is fixed on the tubular sleeve member (1) and is connected electrically to the press button switch (11).

Figure 8:
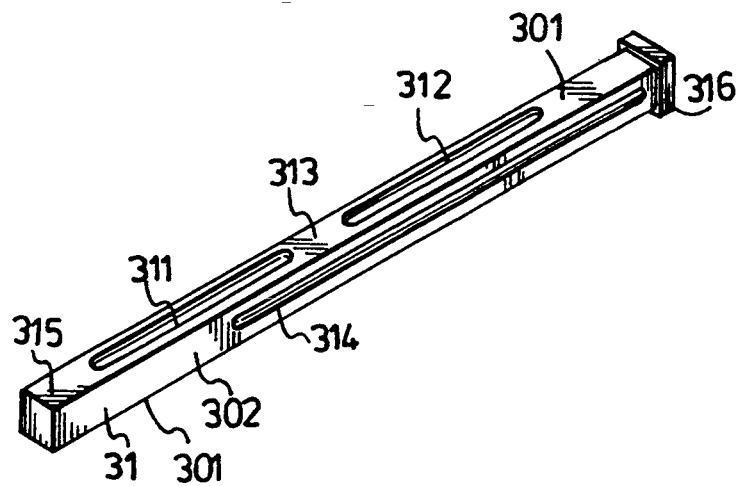
FIG. 8 shows a detailed enlarged view of the pressure indicating stick employed in the first preferred embodiment of the pressure indicator of the present invention.

The pressure indicating stick (31) employed in the first preferred embodiment is rectangular in cross section and has two-pairs of opposed sides. The pressure indicating stick (31) has a first longitudinal groove (311) formed in one side of a first pair of opposed sides (301) adjacent to one end (315) of the stick (31), a second longitudinal groove (312) that is aligned and spaced interiorly in a lengthwise direction from the first longitudinal groove (311), and an intermediate portion (313) flush with the external surface of the side (301), a pair of engaging grooves (314) that are formed in a second pair of opposed sides (302) and that extend in the lengthwise direction, and a longitudinal scale (not shown) formed in the remaining one of the first pair of opposed sides (301), as shown in FIG. 8. The second longitudinal groove (312) is closer to a piston member (34) disposed in the elongated casing (3) than the first longitudinal groove (311). The engaging hooks (15) of the tubular sleeve member (1) extend into the engaging grooves (314) in the pressure indicating stick (31) so as to permit linear movement of the stick (31) along the elongated casing (3) without rotation of the same. Thus, the first and second longitudinal grooves (311, 312) are kept aligned with the press button switch (11) of the alarm generating device.

When the pressure indicator is not in use, i.e., under the normal operating condition, the second end (315) of the pressure indicating stick (31) extends into the through bore (113) of the tubular sleeve member (1), and the external surface of the side (301) adjacent to the end (315) of the stick (31) compresses the press button switch (11), thereby deactivating the alarm generating device such that the buzzer (13) does not generate sound. Light emitting diodes can be used in the alarm generating device instead of the buzzer (13).

Figure 5:
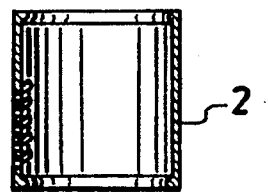
FIG. 5 shows a cross sectional view of a protective member which is to be sleeved around a sleeve member of the pressure indicator of the present invention.
Figure 6:
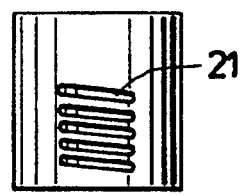
FIG. 6 is a side view of the protective member of FIG. 5.
Figure 7:
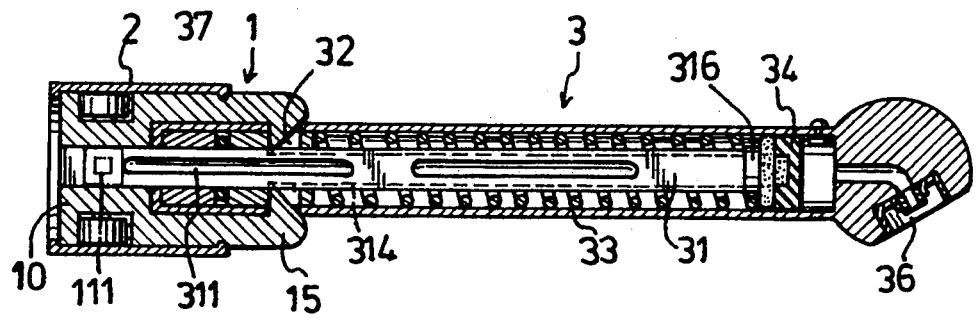
FIG. 7 shows a cross sectional view of the first preferred embodiment of the present invention.

A protective member (2) has a plurality of viewing slots (21) and is provided around the tubular sleeve member (1) so that the sound output of the buzzer (13) or the light output from the light emitting diode can pass through the slots (21), as best illustrated in FIGS. 5 and 6.

Figure 9:
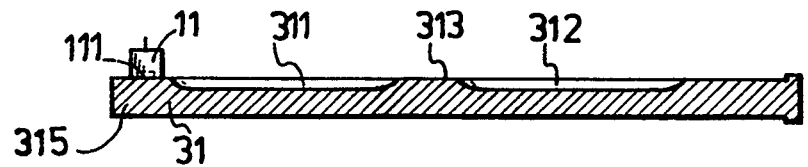
FIG. 9 shows the pressure indicating stick of FIG. 8 and the press button switch of the alarm generating device employed in the pressure indicator of the present invention.
Figure 10:
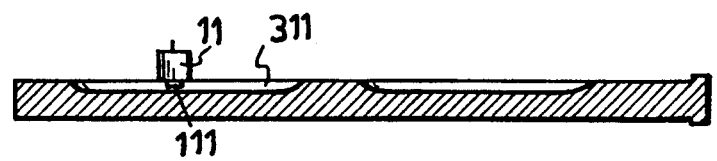
FIGS. 10, 11 and 12 respectively show the positions of the press button switch of the alarm generating device in relation to the pressure indicating stick of the pressure indicator of present invention during insufficient pressure, normal pressure and excessive pressure conditions.
Figure 11:
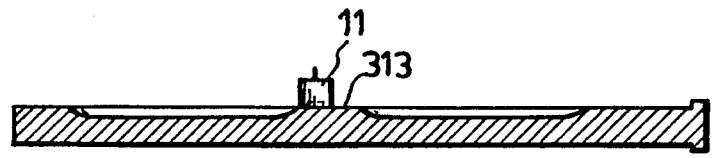
Figure 12:

FIG. 9 shows the position of the press button switch (11) in relation to the pressure indicating stick (31) of the preferred embodiment when the latter is not in use. The end (315) of the pressure indicating stick (31) reads "0" on the longitudinal scale. When the pressure indicator of the present invention is attached to a tire that has sufficient pressure therein, the pressure indicating stick (31) extends out of the elongated casing (3) such that the intermediate portion (313) of the pressure indicating stick (31) compresses a press button (111) of the press button switch (11), as shown in FIG. 11, thereby deactivating the alarm generating device. When the tire has insufficient pressure therein, the exposed portion of pressure indicating stick (31) is shorter than that when the tire has adequate pressure therein. The press button (111) of the press button switch (11) extends into the first longitudinal groove (311) at this stage. When the tire is over-inflated, the exposed portion of the pressure indicating stick (31) is longer than that when the tire has adequate pressure therein. The press button (111) of the press button switch (11) extends into the second longitudinal groove (312) at this stage. When the press button (111) is not compressed, the alarm generating device is activated. The actuation of the alarm device serves to remind the user of the pressure indicator of the present invention that the tire has to be attended to. Thus, the present invention permits inspection of a tire regardless of the light conditions.

Since the other end (316) of the pressure indicating stick (31) is detachably connected to the piston member (34), which piston member (34) hermetically contacts the inner wall surface of the elongated casing (3), and since the compression spring (33) is sleeved around the stick (31) and is disposed between the piston member

(34) and the other end (37) of the elongated casing (3), the pressure indicating stick (31) must be pushed back into the elongated casing (3) manually so that "0" reading can be read on the longitudinal scale after each tire checking operation. The spring force of the compression spring (33) is chosen so that the press button (111) abuts the intermediate portion (313) of the pressure indicating stick (31) when the tire has sufficient pressure therein.

Figure 13:
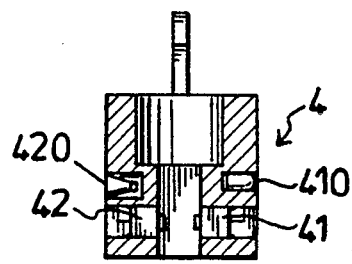
FIG. 13 shows a fragmentary cross sectional view of a second preferred embodiment of the pressure indicator of the present invention, the main casing of the pressure indicator being removed for better illustration.
Figure 14:
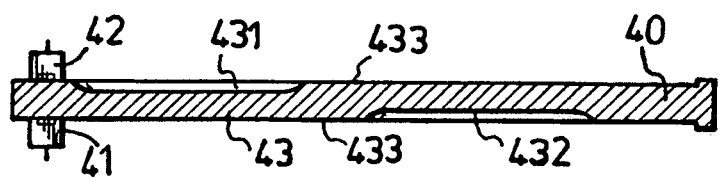
FIG. 14 shows a detailed view of the pressure indicating stick employed in the second preferred embodiment of the pressure indicator of the present invention.

Referring to FIGS. 13 and 14, in one preferred embodiment of this invention, the alarm generating device includes two circuits as shown in FIG. 1 (A), each of which generates a different alarm signal and have a press button switch for actuating the same. The press button switches (41, 42) are fixed to an inner wall surface of the tubular sleeve member (4) at diametrically opposite positions and are respectively connected to a buzzer (420) and a light emitting diode (410) of the alarm generating device. The pressure indicating stick (40) has first and second longitudinal grooves (431, 432), which are spaced and staggered from one another in a circumferential direction so as to correspond with the respective press button switch (41, 42), and an intermediate portion (433) provided circumferentially between the first and second longitudinal grooves (431, 432). This arrangement permits the generation of a buzzing sound output when the tire has insufficient pressure therein and permits the generation of light signals when the tire is overinflated. The pressure condition within the tire can be determined by listening to the sound output or by viewing the light output.

Figure 15:
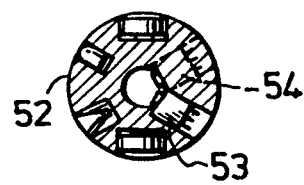
FIG. 15 shows a top view of a part of the third preferred embodiment of the pressure indicator of the present invention, the main casing of the pressure indicator being removed for better illustration.
Figure 16:
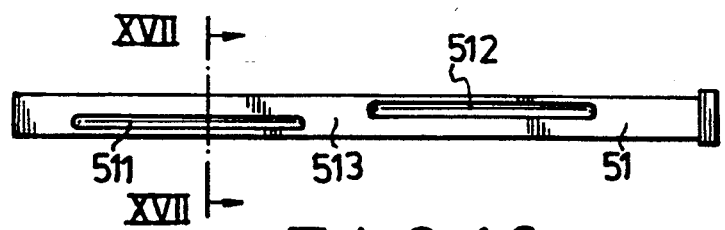
FIG. 16 shows the pressure indicating stick employed in the third preferred embodiment of the pressure indicator of the present invention.
Figure 17:
FIG. 17 shows a cross sectional view of the pressure indicating stick taken along line XVII—XVII in FIG. 16.

Referring to FIGS. 15 to 17, in a third preferred embodiment of the pressure indicator of the present invention, two press button switches (53, 54) of two circuits of the alarm generating device can be disposed side by side in an inner wall surface of the sleeve member (52). The first and second longitudinal grooves (511, 512) are spaced in the lengthwise direction and in a circumferential direction so that each of the longitudinal grooves (511, 512) correspond with one of the press button switches (53, 54).

Figure 18:
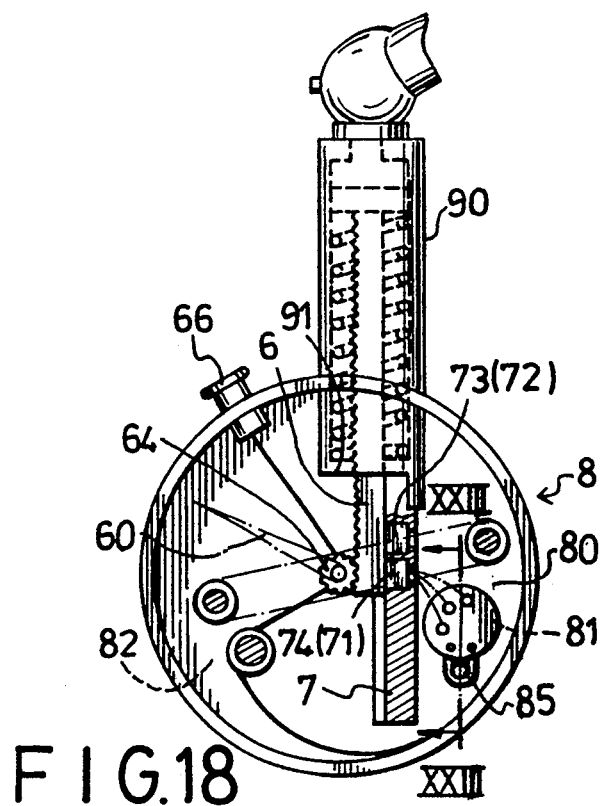
FIG. 18 shows a fourth preferred embodiment of the pressure indicator of the present invention.
Figure 19:
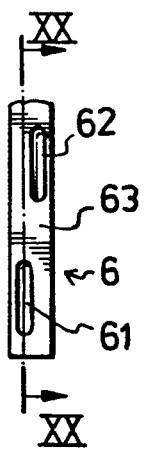
FIG. 19 shows a fragmentary view of the pressure indicating stick employed in the pressure indicator of FIG. 18.
Figure 20:
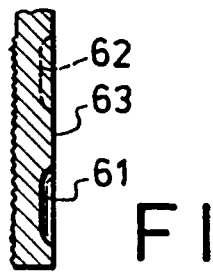
FIG. 20 shows a cross sectional view of the pressure indicating stick taken along line XX—XX in FIG. 19.
Figure 21:
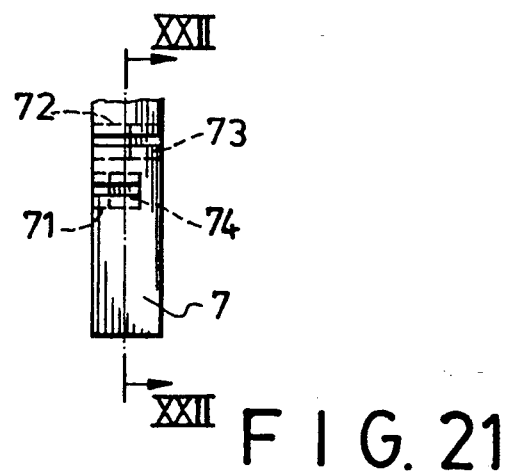
FIG. 21 shows a plate member of the fourth preferred embodiment of the pressure indicator which is disposed adjacent to the pressure indicating stick of the same.
Figure 22:
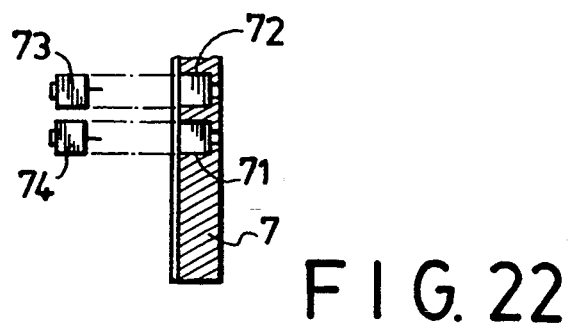
FIG. 22 shows a cross sectional view of the plate member of the fourth preferred embodiment of the pressure indicator taken along line XXII—XXII in FIG. 21.
Figure 23:
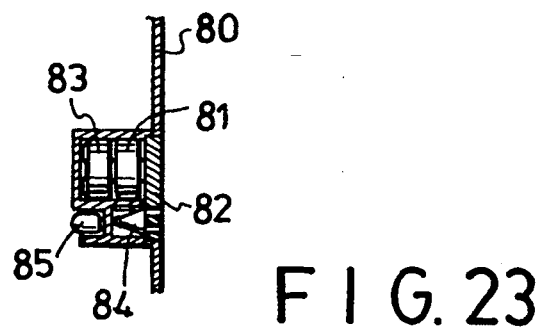
FIG. 23 shows a cross sectional view of the pressure indicator taken along line XXIII—XXIII in FIG. 18.

Referring to FIG. 18, a gauge-type pressure indicator includes an elongated casing (90) which has one end (91) inserted partially into a circular casing (8). The circular casing (8) has a rear side (82) and a transparent front side (80) opposite to the rear side (82). The transparent front side (80) is provided with a dial scale. The casing (8) further has a toothed wheel (64) mounted rotatably therein. The pressure indicating stick (6) in this embodiment has a rack that meshes with the toothed wheel (64). An elongated plate member (7) is mounted on an inner face of the rear side (82) and is disposed adjacent to the pressure indicating stick (6) in a parallel manner. Two press button switches (73, 74) of two circuits of the alarm generating device are fixed respectively in two receiving holes (71, 72) in the plate member (7), as illustrated in FIGS. 21 and 22, and are compressed by the pressure indicating stick (6). The longitudinal grooves (61, 62) in the pressure indicating stick (6) are staggered, as shown in FIGS. 19 and 20, so as to complement the press button switches (73, 74). The power source (83), the light emitting diodes (84) and buzzer (85) of the alarm generating device are disposed in a chamber (81) mounted on an inner face of the front side (80). The chamber (81) has a cover lid (82) so that the power source or light emitting diodes can be replaced from an exterior of the circular casing (8). The rack on the pressure indicating stick (6) and the toothed wheel (64) permit linear movement of the pressure indicating stick (6) so that the longitudinal grooves (61, 62) in the stick (6) are kept aligned with the respective press button switches (73, 74). A means (66), which is used to rotate an indicator (60) so as to read "0" on the dial scale of the front side (80) and to push simultaneously the pressure indicating stick (6) back into the elongated casing (90) after each pressure checking operation, is provided on the circular casing (8). The function and feature are the same as those of the previous embodiments.

While preferred embodiments have been described and illustrated, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A pressure gauge, comprising:
   an elongated main casing having a first end for connection to an inflating valve of a tire and a second end, a piston member movably positioned inside said main casing and in tight contact with an interior wall surface of said main casing, an elongated pressure indicating stick having a first end portion disposed inside said main casing adjacent to said piston member and a second end portion wherein said pressure indicating stick has a first predetermined length such that said second end portion is positioned outside said second end of said main casing when a pressure reading for the tire is detected by the gauge, and a compression spring which is positioned around said pressure indicating stick between said piston member and said second end portion of said main casing;
   an alarm generating device having a first press button switch for actuating said alarm generating device, said first press button switch being disposed adjacent to said second end of said main casing, said second end portion of said pressure indicating stick having a side face normally compressing said first press button switch, thereby normally deactivating said alarm generating device;
   said pressure indicating stick further having a first longitudinal groove formed in said side face, said first longitudinal groove being parallel to an axis of said pressure indicating stick; and
   a mechanism for guiding said pressure indicating stick so as to register said first longitudinal groove of said pressure indicating stick with said first press button switch, when said first end of said main casing is connected to said inflating valve of said tire, and when said pressure indicating stick moves in said main casing so as to expose a second predetermined length of said pressure indicating stick which is greater than said first predetermined length out of said main casing so as to correspondingly release said first press button switch from compression in order to activate said alarm generating device.

2. The pressure gauge mechanism as defined in claim 1, wherein said guiding mechanism includes a tubular sleeve member which is partially sleeved around said second end of said main casing, said tubular sleeve member having an internal wall which has a bore extending therethrough, said first press button switch being disposed in said internal wall, and said second end portion of said pressure indicating stick extending into said through bore;

said guiding mechanism further including two aligned radial holes formed through a wall of said main casing adjacent to said second end of said main casing, said tubular sleeve member further having two hook members which extend into said radial holes of said main casing;

said pressure indicating stick further having a pair of opposed engaging grooves formed therein, said engaging grooves being parallel to said axis of said pressure indicating stick and being spaced circumferentially from said first longitudinal groove, said pair of engaging grooves of said pressure indicating stick being disposed inside said main casing, said hook members of said tubular sleeve member extending into said opposed engaging grooves of said pressure indicating stick so as to provide linear movement of said pressure indicating stick while preventing rotation of said pressure indicating stick.

3. The pressure gauge as defined in claim 2, wherein said alarm generating device further includes a second press button switch disposed in said internal wall of said tubular sleeve member opposite to said first press button switch, said pressure indicating stick further including a second longitudinal groove parallel to the axis of said stick and spaced circumferentially with respect to said first longitudinal groove and located closer to said piston member than said first longitudinal groove, said second longitudinal groove being aligned with said second press button switch.

4. The pressure gauge as defined in claim 1, which comprises a circular casing, said second end of said elongated main casing being partially inserted into said circular casing, said circular casing having a transparent front side provided with a scale, a rear side opposite to said front side and a toothed wheel rotatably mounted therein, said pressure indicating stick having a rack adjacent to said second end portion thereof and meshed with said toothed wheel, said circular casing further including an elongated plate member mounted on an inner face of said rear pressure indicating stick in a parallel manner, and said first press button switch being disposed on said plate member.

* * * * *